March 10, 1931.                C. B. GRAY                1,795,303
                           SHEARING MACHINE
                    Filed July 6, 1929      2 Sheets-Sheet 2

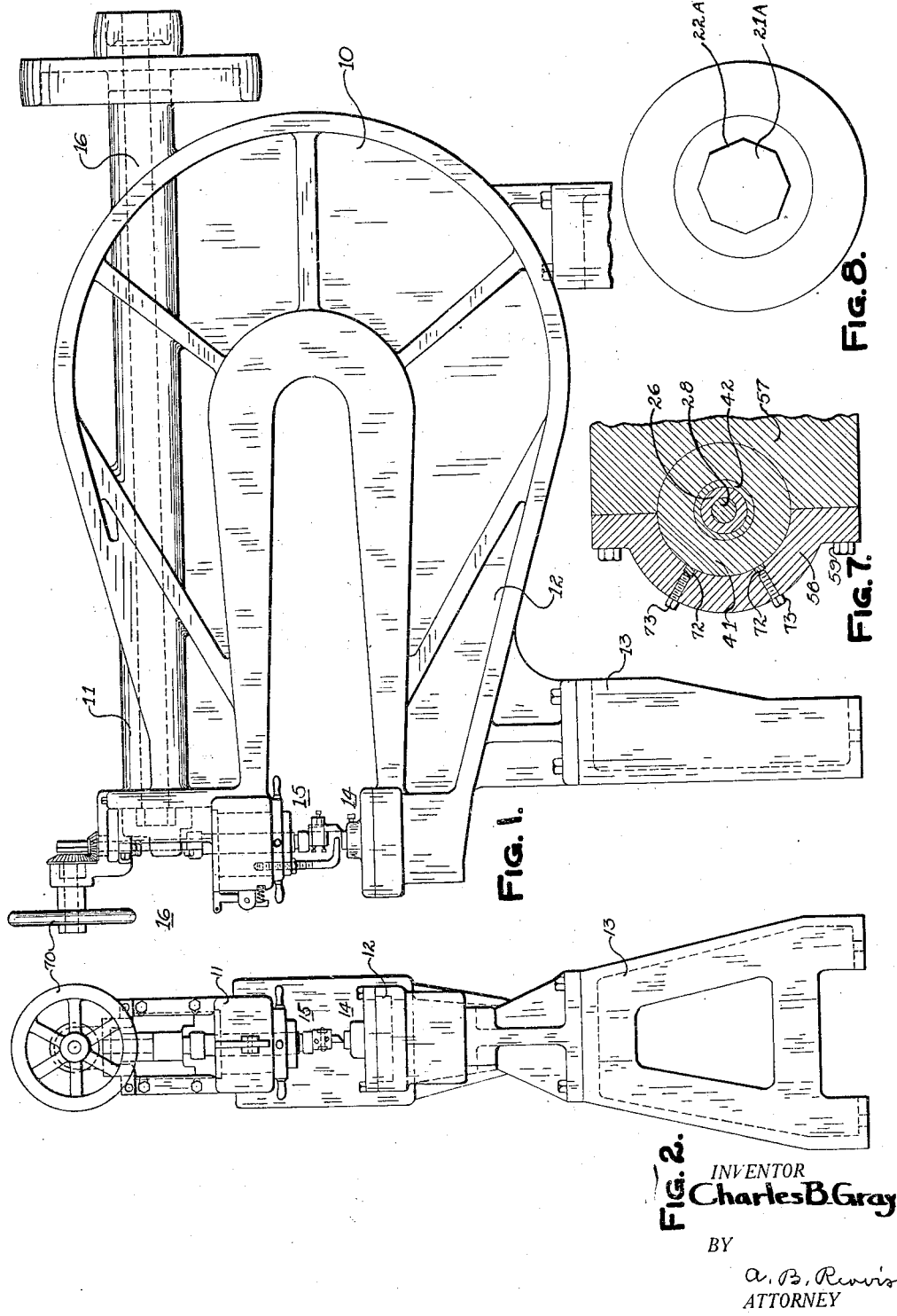

INVENTOR
Charles B. Gray.
BY
*a. B. Rravis*
ATTORNEY

Patented Mar. 10, 1931

1,795,303

UNITED STATES PATENT OFFICE

CHARLES B. GRAY, OF MILLBOURNE, PENNSYLVANIA

SHEARING MACHINE

Application filed July 6, 1929. Serial No. 376,418.

My invention relates to shearing machines of the type suitable for shearing plate-formed material and it has for an object to provide a machine of this character capable of shearing in any desired direction, of shearing a wide range of thicknesses and kinds of materials, and one having a rigid guide construction for the ram extending down close to the shear blade carried by the latter.

My improved machine consists essentially of a shear block having a peripheral shearing edge; a ram aligned with the block, and a shear blade carried eccentrically by the ram so as to cooperate with the peripheral shearing edge. The ram is carried by an angularly adjustable guide so that the blade may be brought into cooperation with a desired portion of the peripheral shearing edge; and, as the guide member may fit the ram relatively close to the shear blade carried by the latter, such shear blade is very strongly supported, this result being aided by locating the key connection between the guide and the ram and the detent for holding the guide member at the upper side of the latter. In operation, the ram is reciprocated and the range of reciprocating movement may be shifted by suitable feed mechanism, this being desirable with material beyond a predetermined thickness, as the shear blade may be caused to shear in the same place for several reciprocations, increments of feed of the shear blade taking place between reciprocations. A further object of my invention is to provide a shearing machine having these advantageous features of construction.

This application is a continuation in part of subject matter divided from my application Serial No. 248,449, filed January 21, 1928.

These and other objects are effected by my invention, as will be apparent from the following description and claims taken in connection with the accompanying drawings, forming a part of this application, in which:

Fig. 1 is a side elevation of my improved machine;

Fig. 2 is an end elevation of the machine;

Fig. 3 is a detail end elevation drawn to larger scale than Fig. 2;

Fig. 4 is a vertical sectional view of apparatus shown in Fig. 3;

Fig. 5 is a detail sectional view of the lower portion of the ram;

Fig. 6 is a sectional view taken along the line VI—VI of Fig. 4;

Fig. 7 is a sectional view taken along the line VII—VII of Fig. 4; and

Fig. 8 shows a modified form of shearing block.

Referring now to the drawings more in detail, in Fig. 1, I show a frame 10 having upper and lower arms 11 and 12; a suitable bed plate or supporting structure 13 cooperating with the frame. The lower arm 12 carries shear block means, at 14, with which cooperates reciprocating shear blade mechanism, at 15, carried by the upper arm 11. The shear blade mechanism, at 15, is reciprocated by power derived from the driving or power shaft 16; and, with the same stroke, the shear mechanism, at 15, may be adjusted relatively to the shear block means, at 14, by suitable feed or screw-down mechanism, at 16.

The shear block means, at 14, preferably comprises a supporting plate 17 secured to the lower arm 12 by bolts or screws 18 and having an upper hollow boss 20 within which is disposed the shear block 21 having an upper peripheral shearing edge 22. The block may be held in place by any suitable means, as by a screw 23.

The shear blade mechanism, at 15, includes a blade 24 having a shearing edge 25 which cooperates with the shearing edge 22, the blade 24 being eccentrically carried by the ram 26, the latter being axially aligned with the shear block 21.

While any suitable form of eccentric mounting may be employed for connecting the blade 24 to the ram 26, I show, by way of example, a connection including a holder body member 27 (Fig. 5) having a shank 28 fitting the bore 29 of the ram 26 and a foot 30 having a seating face 31 approximately the same distance from the axis of the ram 26 and of the block 21 as the radius of the latter. A U-shaped strap 32 has an interior face 33 opposed to the face 31 and legs 34 fitting horizontal lateral grooves 35 in the foot 30 and being secured to the latter by a pin 36. The blade is securely clamped in adjusted position by opposed screws 37 and 38 carried by the foot 30 and by the U-shaped strap 32. This type of connection is strong, holds the shear blade securely, and provides for quick removal of the shear blade simply by removing the pin 36. The holder 27 may be secured to the ram in any suitable manner, as by the ring 40 having an interior conical surface co-operating with the split gripping ring 40a.

The ram 26 is carried by a guide member 41 having a guide bearing or bushing 42 whose interior bearing surface 43 is coaxial with the shear block 21. As shown, the bearing 43 is of the conical, wear-compensating type so that accurate bearing relation may be maintained, the nut 44 being employed to exert pressure on the bushing.

The upper end of the ram 26 is swivelled, at 45, to the lower end of the screw 46, which is threaded to the cross head 47 fitting a vertical guideway 48 provided on the upper arm 11, the cross head being retained in the guideway by detachable plates 49. The cross head has a horizontal groove 50 with which cooperates an eccentric 51 on the drive shaft 16, the eccentric preferably fitting a shoe 52 arranged in the groove. With rotation of the drive shaft 16, the eccentric and slot converts rotary motion of such shaft into reciprocatory motion of the cross head 47 and of the ram.

The guide member 41 has an external journal portion 53 fitting the bearing 54 carried by the upper arm 11. The guide member 41 is provided with upper and lower flanges 55 and 56, respectively, cooperating with the bearing 54 to prevent axial movement of the guide member. The bearing 54 is made in two parts, a back part 57 integral with the arm 11 and a cap part 58 connected to the back part by screws or bolts 59. The guide member 41 may, therefore, be turned, or have a turret-like action, this being facilitated by handle means 59' provided on the guide member and preferably on the flange 56.

In order that the ram 26 may be rotated by the guide 41, a slidable key connection may be employed. For example, I show the ram 26 having a longitudinal slot 60 within which slidably fits the key 61 carried by the upper end of the guide member 41. By moving the member 41, the shear blade 24 may be moved about the shear block 21. If desired, the upper flange may be notched at 62 to receive the releasable detent 63 engaged by the spring 64. The detent has a notch-engaging portion oblong in cross-section, whereby substantial side surfaces are provided to resist angular movement of the guide member and play of the latter is minimized. As the slidable key and detent mechanisms are arranged adjacent to the upper end of the guide member 41, the latter may extend down close to the shear blade 24, whereby a rigid support for the ram and the blade is provided.

The screw 46 may be turned while the machine is in operation to raise or to lower the shearing edge 25 with respect to the shearing edge 22 of the die block 21. This is desirable when shearing material, where excessive stresses would be imposed, by attempting to pierce a sheet with continuous pressure in a single stroke. After raising the blade 24 a sufficient distance above the blank, the screw may be turned to gradually lower the cutting edge 25, a shearing increment taking place during each working stroke, and any number of strokes may be used without moving the blank in order to shear through. It will be obvious that this is advantageous in shearing thick or resistant material. Also, with materials of different thickness, raising and lowering of the shear blade 24 is desirable for another reason. The action of shearing thin material is somewhat different from that of shearing thick material. With thin material, there is very little internal distortion or deformation in the shear plane, and the shear tool must overlap the peripheral edge to obtain a cut-out action. On the other hand, with thicker material, a shear cut may be made without the tool going entirely through, this being due to the internal distortion or deformation and high stress set up in the material. Hence, for these reasons, the adjustment feature is desirable. The screw 46 is provided with jam nut means 46a to set the shearing tool 24 in proper depth relation with respect to the die block 21 for the particular stock being sheared, and it maintains this setting until a change of setting is made.

In order that the screw 46 may be conveniently turned, I show the latter provided with an upper portion 66 having a slidable and non-rotatable connection with the gear 67 carried by a supporting member 68 connected to the upper arm 11. The gear 67 meshes with a gear 69 preferably rotatable about a horizontal axis so that the actuating member or hand wheel 70 may be located for convenient operation.

To assure that the guide member shall fit the bearing 54 snugly and without any lateral play, I prefer to provide strips 72 arranged longitudinally of the bearing and projecting interiorly thereof. As shown in the drawings, two such strips are shown with screws 73 for maintaining them tight.

The guide member 41 is provided with a hold-down 74 to prevent tilting of the work incident to shearing, the hold-down being adjustably connected to the guide so that it may be adjusted suitably to the thickness of material to be sheared. For example, I show the hold-down threaded at 76 to the guide with a jam nut 77 to hold it in adjusted position. The hold-down has a foot portion 78 disposed in opposed relation with respect to the shear blade 24 and preventing tilting of a blank about the shearing edge 22 by the blade edge 25.

If desired, as shown in Fig. 8, a shear block 21b having a shearing edge 22a made of straight sections may be used, in which case the outline of the edge would be polygonal instead of circular. Of course, the detent mechanism for the guide member 41 would be so arranged as to bring the shear edge 25 into proper relation with respect to the straight portions of the peripheral shearing edge 22a.

My improved machine operates as follows: A blank is placed above the shear block 21 and the shearing edge 22 cooperates with the shearing edge 25 to provide for shearing cuts. As the blade 24 is reciprocated at fairly high speed, shearing or cutting of a plate may be accomplished by desired small increments of feed of the blank; and, if it is not desired to shear through for each stroke, a number of strokes may be used to cut through for each feed increment of the blank. The screw-down mechanism may be easily operated when taking several cuts in one place. The operator would apply turning effort to the handwheel 70 which would be effective to lower the ram slightly during the short interval of time the shear blade 24 is above the work, the extent of lowering for each stroke depending upon the applied turning effort. Curved lines or angles may be followed by turning the blank or the ram or both. The ram is strongly supported. The bearing 54 is practically a part of the upper arm 11; the guide member fits the bearing accurately; and the guide member may be carried down close to the shear blade. The detent 64 serves to hold the ram in predetermined positions of angular adjustment. If, at any time it is desired to obtain tightening of the guide member with respect to the bearing, this may be done by tightening the screws 73.

While I have shown my invention in two forms, it will be obvious to those skilled in the art that it is not so limited, but is susceptible of various other changes and modifications, without departing from the spirit thereof; and I desire, therefore, that only such limitations shall be placed thereupon as are imposed by the prior art or as are specifically set forth in the appended claims.

What I claim is:

1. In a shear, the combination of a shear block which is fixed in operation and having an end completely surrounded by a boundary shearing edge, a reciprocatory ram disposed in opposed relation with respect to the block, a shear blade carried eccentrically by the ram and cooperating with said shearing edge, an angularly adjustable guide for the ram, means for preventing relative angular movement between the guide and the ram, and means for turning the guide so as to cause the shear blade to cooperate with any desired portion of said boundary shearing edge.

2. In a shear, the combination of a shear block which is fixed in operation and having an end completely surrounded by a boundary shearing edge, a reciprocatory ram disposed in opposed relation with respect to the block, a shear blade carried eccentrically by the ram and cooperating with said shearing edge, a guide for the ram, and means providing for angular adjustment of the ram about its longitudinal axis to bring the blade into cooperative relation with a desired portion of the block shearing edge.

3. In a shear, the combination of a shear block which is fixed in operation and having an end completely surrounded by a boundary shearing edge, a reciprocatory ram disposed in opposed relation with respect to the block, a shear blade carried eccentrically by the ram and cooperating with said shearing edge, a guide for the ram, a slidable key connection between the guide and the ram, means for adjusting the guide angularly, and means for adjusting the ram toward and from the block while the shear is operating.

4. In a shear, the combination of a shear block which is fixed in operation and having an end completely surrounded by a boundary shearing edge, a reciprocatory ram disposed in opposed relation with respect to the block, a shear blade carried eccentrically by the ram and cooperating with said shearing edge, a guide for the ram, a slidable key connection between the guide and the ram, at the side of the guide remote from the shear blade, means for adjusting the guide angularly, and means for holding the guide in adjusted position.

5. In a shear, the combination of a shear block which is fixed in operation and having an end completely surrounded by a boundary shearing edge, a reciprocatory ram aligned with the block, a shear blade carried eccentrically by the ram so as to cooperate with said boundary shearing edge, means providing for angular adjustment of the ram about its axis, a reciprocatory cross head, a screw swivelled to the ram and having a threaded connection with respect to the cross head, and means for adjusting the screw relatively to the cross head.

6. In a shear, the combination of a shear block which is fixed in operation and having an end completely surrounded by a boundary shearing edge, a reciprocatory ram aligned with the block, a shear blade carried eccentrically by the ram so as to cooperate with said boundary shearing edge, means providing for angular adjustment of the ram about its axis, a reciprocatory cross head, a screw swivelled to the ram and having a threaded connection with respect to the cross head, a rotary adjusting member, and means for transmitting angular motion of the adjusting member to the screw without interfering with reciprocatory motion of the screw relatively to the adjusting member.

7. In a shear, the combination of relatively vertically movable shear members, a vertically disposed reciprocatory ram connected to one of the members, a vertical screw having a swivelled connection with respect to the ram, an actuating reciprocatory cross head having a threaded connection with respect to the screw, a first gear member, a slidable and angular motion transmitting connection between the gear and the screw, a second gear member meshing with the first gear member and movable about a horizontal axis, and an adjusting member connected to the second gear member.

8. In a shear, the combination of a frame having first and second opposed arms, a shearing block which is fixed in operation and having an end completely surrounded by a boundary shearing edge and carried by the first arm, a bearing provided on the second arm and coaxial with the block, a guide member journalled in the bearing and restrained against axial movement relatively thereto, the guide member having a guide opening coaxial with the block, a ram fitting the guide opening, a shear blade for cooperation with said boundary shearing edge and carried eccentrically by the ram, means for reciprocating the arm, a slidable key connection between the ram and the guide member, means for turning the guide member, and detent means for holding the guide member in positions of adjustment.

9. In a shear, the combination of a frame having first and second opposed arms, a shearing block which is fixed in operation and having an end completely surrounded by a boundary shearing edge and carried by the first arm, a bearing provided on the second arm and coaxial with the block, a guide member journalled in the bearing and restrained against axial movement relatively thereto, the guide member having a guide opening coaxial with the block, a ram fitting the guide opening, a shear blade for cooperation with said boundary shearing edge and carried eccentrically by the ram, means for reciprocating the ram, a slidable key connection between the ram and the guide member, means for turning the guide member, detent means for holding the guide member in positions of adjustment, and means providing for adjustment of the ram relatively to the block while the shear is operating.

10. In a shear, the combination of a frame having first and second opposed arms, a shearing block which is fixed in operation and having an end completely surrounded by a boundary shearing edge and carried by the first arm, a bearing provided on the second arm and coaxial with the block, a guide member journalled in the bearing and restrained against axial movement relatively thereto, the guide member having a guide opening coaxial with the block, a ram fitting the guide opening, a shear blade for cooperation with said boundary shearing edge and carried eccentrically by the ram, a reciprocatory cross head carried by the second arm, a drive shaft carried by the second arm for reciprocating the cross head, a screw having a swivelled connection with respect to the ram, a rotary adjusting member carried by the second arm and having a slidable angular motion transmitting connection with respect to the screw, means for preventing relative angular movement between the ram and the guide member, and means for adjusting the guide member about the axis of said bearing.

11. In a shear, the combination of a frame having upper and lower arms, a shear block having a top peripheral shearing edge and carried by the lower arm, a bearing provided on the upper arm and coaxial with said block, a guide member journalled in said bearing and restrained against axial movement, the guide member having an axial opening coaxial with the block, a ram fitting the guide opening, a shear blade for cooperating with said peripheral shearing edge and carried eccentrically by the ram, a vertical guideway provided on the upper arm and above the bearing, a cross head fitting the guideway and having a transverse groove, a drive shaft carried by the upper arm and having an eccentric portion cooperating with said groove, a screw having a swivelled connection with respect to the ram and threaded to the cross head, a first gear member carried by the upper arm and having a slidable angular motion transmitting connection with respect to said screw, a second gear movable about a horizontal axis and meshing with the first gear, operating means for the second gear, means for preventing relative angular movement between the ram and the guide member, and means for adjusting the guide member about the axis of said bearing.

12. In a shear, the combination of a frame having upper and lower arms, a shear block having a top peripheral shearing edge and carried by the lower arm, a bearing provided on the upper arm and coaxial with said block, a guide member journalled in said bearing and restrained against axial movement, the guide member having an axial opening coaxial with the block, a ram fitting the guide opening, a shear blade for cooperation with said peripheral shearing edge and carried eccentrically by the ram, a vertical guideway provided on the upper arm and above the bearing, a cross head fitting the guideway and having a transverse groove, a drive shaft carried by the upper arm and having an eccentric portion cooperating with said groove, a screw having a swivelled connection with respect to the ram and threaded to the cross head, a first gear member carried by the upper arm and having a slidable angular motion transmitting connection with respect to said screw, a second gear movable about a horizontal axis and meshing with the first gear, operating means for the second gear, means for preventing relative angular movement between the ram and the guide member, means for adjusting the guide member about the axis of said bearing, and detent means carried by the upper arm and cooperating with the guide member for holding the latter in adjusted positions.

13. In a shear, the combination of a frame having upper and lower arms, a shear block having a top peripheral shearing edge and carried by the lower arm, a bearing provided on the upper arm and coaxial with said block, a guide member journalled in said bearing and restrained against axial movement, the guide member having an axial opening coaxial with the block, a ram fitting the guide opening, a shear blade for cooperation with said peripheral shearing edge and carried eccentrically by the ram, a vertical guideway provided on the upper arm and above the bearing, a cross head fitting the guideway and having a transverse groove, a drive shaft carried by the upper arm and having an eccentric portion cooperating with said groove, a screw having a swivelled connection with respect to the ram and threaded to the cross head, a first gear member carried by the upper arm and having a slidable angular motion transmitting connection with respect to said screw, a second gear movable about a horizontal axis and meshing with the first gear, operating means for the second gear, means provided at the top of the guide member for preventing relative angular movement between the ram and the guide member, means cooperating with the lower end of the guide member for adjusting the latter about the axis of said bearing, and detent means carried by the upper arm and cooperating with the upper end of the guide member for holding the latter in adjusted positions.

14. In a shear, the combination of a frame having upper and lower arms; a shear block carried by the lower arm and having a peripheral shearing edge; a bearing carried by the upper arm and arranged coaxially with respect to the block; the bearing including mating parts, one of which is integral with the upper arm and the other of which is a cap part, and means for securing the bearing parts together; a guide member having a journal portion fitting the bearing and upper and lower flanges cooperating with the bearing to prevent axial movement of the guide member relatively to the bearing; a ram guided by the guide member and arranged coaxially with respect to the shear block; means carried by the upper arm for reciprocating the ram; a shear blade carried eccentrically by the lower end of the ram and cooperating with said peripheral shearing edge; and means for moving the guide member angularly in said bearing.

15. In a shear, the combination of a frame having upper and lower arms; a shear block carried by the lower arm and having a peripheral shearing edge; a bearing carried by the upper arm and arranged coaxially with respect to the block; the bearing including mating parts, one of which is integral with the upper arm and the other of which is a cap part, and means for securing the bearing parts together; a guide member having a journal portion fitting the bearing and upper and lower flanges cooperating with the bearing to prevent axial movement of the guide member relatively to the bearing; a ram guided by the guide member and arranged coaxially with respect to the shear block; means carried by the upper arm for reciprocating the ram; a shear blade carried eccentrically by the lower end of the ram and cooperating with said peripheral shearing edge; releasable holding means carried by the upper arm and cooperating with the upper flange to hold the guide member against angular movement in the bearing; and means for moving the guide member angularly in said bearing.

16. In a shear, the combination of a frame having upper and lower arms; a shear block carried by the lower arm and having a peripheral shearing edge; a bearing carried by the upper arm and arranged coaxially with respect to the block; the bearing including mating parts, one of which is integral with the upper arm and the other of which is a cap part, and means for securing the bearing parts together; a guide member having a journal portion fitting the bearing and upper and lower flanges cooperating with the bearing to prevent axial movement of the guide member and arranged coaxially with respect to the shear block; means carried by the upper arm for reciprocating the ram; a shear blade carried eccentrically by the lower end of the ram and cooperating with said peripheral shearing edge; releasable holding means carried by the upper arm and cooperating with the upper flange to hold the guide member against angular movement in the bearing; and handle means connected to the lower flange for moving the guide member angularly in said bearing.

17. In a shear, the combination of a frame having upper and lower arms, a vertical shear block carried by the lower arm and having an upper peripheral shearing edge, a vertical bearing carried by the upper arm and coaxial with respect to said block, a guide member journalled in said bearing and having upper and lower flanges cooperating with the bearing, a ram arranged coaxially with respect to the block and guided by said member, means carried by the upper arm for reciprocating the ram, a shear blade carried eccentrically by the lower end of the ram and cooperating with said shearing edge, releasable holding means carried by the upper arm and cooperating with the upper flange to hold the guide member, and handle means secured to the guide member below the bearing.

18. In a shear, the combination of a frame having first and second opposed arms, a shear block which is fixed in operation and carried by the first arm and having an end completely surrounded by a boundary shearing edge, a two-part bearing carried by the second arm and coaxial with the shear block, one part of the bearing being integral with the second arm and the other part being a cap secured to the first part, a guide member journalled in the bearing and having a guide opening axially aligned with the shear block, a ram fitting the guide opening, a shear blade for cooperation with said boundary shearing edge and carried eccentrically by the ram, means for reciprocating the ram, a spline connection between the guide and the ram, means for turning the guide member to bring the shear blade into cooperation with a desired region of the shearing edge, and tightening means carried by the cap part of the bearing and cooperating with the guide member journal portion to take up for looseness.

19. In a shearing machine, the combination of a shear block which is fixed in operation and having a peripheral shearing edge, a shear blade cooperating with the shearing edge and adjustable angularly about the shear block, and hold-down means movable angularly with the blade and arranged oppositely to the blade crosswise of the top of the shear block to prevent tilting of stock during shearing strokes.

20. In a shear, the combination of a frame having first and second opposed arms, a shearing block which is fixed in operation and having an end completely surrounded by a boundary shearing edge and carried by the first arm, a bearing provided on the second arm and coaxial with the block, a guide member journalled in the bearing and restrained against axial movement relatively thereto, the guide member having a guide opening coaxial with the block, a ram fitting the guide opening, a shear blade for cooperation with said boundary shearing edge and carried eccentrically by the ram, means for reciprocating the ram, a slidable key connection between the ram and the guide member, and means for angularly adjusting the guide member.

21. In a shear, the combination of a frame having first and second opposed arms, a shearing block which is fixed in operation and having an end completely surrounded by a boundary shearing edge and carried by the first arm, a bearing provided on the second arm and coaxial with the block, a guide member journalled in the bearing and restrained against axial movement relatively thereto, the guide member having a guide opening coaxial with the block, a ram fitting the guide opening, a shear blade for cooperation with said peripheral shearing edge and carried eccentrically by the ram, means for reciprocating the ram, a slidable key connection between the ram and the guide member, means for angularly adjusting the guide member, and hold-down means carried by the guide member and disposed oppositely to the shear blade and crosswise of the top of the shear block to prevent tilting of a blank incident to shearing.

22. In a shear, the combination of a frame having first and second opposed arms, a shearing block which is fixed in operation and having an end completely surrounded by a boundary shearing edge and carried by the first arm, a bearing provided on the second arm and coaxial with the block, a guide member journalled in the bearing and restrained against axial movement relatively thereto, the guide member having a guide opening coaxial with the block, a ram fitting the guide opening, a shear blade for cooperation with said boundary shearing edge and carried eccentrically by the ram, means for reciprocating the ram, a slidable key connection between the ram and the guide member, means for angularly adjusting the guide member, and means providing for axial setting of the ram while the shear is operating.

23. In a shear, the combination of a shear block which is fixed in operation and has a shearing edge, a ram disposed in opposed relation with respect to the block, means for reciprocating the ram, a shear blade carried eccentrically by the ram and cooperating with said shearing edge, means independent of said reciprocating means for raising and lowering the ram, and means for turning the ram to cause the blade to cooperate with a desired portion of the shearing edge.

24. In a shear, the combination of a shear block which is fixed in operation and has its upper end completely surrounded by boundary shearing edge, a ram disposed in opposed relation with respect to the block, means for reciprocating the ram, a shear blade carried eccentrically by the ram and cooperating with said shearing edge, means independent of said reciprocating means for raising and lowering the ram, means for turning the ram to cause the blade to cooperate with a desired portion of the shearing edge, and hold-down means arranged oppositely to and crosswise of the top of the block from the blade to prevent tilting of stock.

25. In a shear, the combination of a shear block which is fixed in operation and has a shearing edge, a ram disposed in opposed relation with respect to the block, means for reciprocating the ram, a shear blade carried eccentrically by the ram and cooperating with said shearing edge, means independent of said reciprocating means for raising and lowering the ram, means for turning the ram to cause the blade to cooperate with a desired portion of the shearing edge, and detent means for holding the ram in different positions of angular adjustment.

In testimony whereof, I have hereunto subscribed my name this 2nd day of July, 1929.

CHARLES B. GRAY.